(12) United States Patent
Hulley et al.

(10) Patent No.: US 6,648,028 B2
(45) Date of Patent: Nov. 18, 2003

(54) SAFETY DEVICE FOR LIQUID AERATING APPARATUS

(75) Inventors: Peter Hulley, Port. St. Mary (GB); Peter Gordon Wiseburgh, Jerusalem (IL)

(73) Assignee: Soda-Club (CO2) Atlantic GmbH, Zug (CH)

( * ) Notice: Subject to any disclaimer, the term of this patent is extended or adjusted under 35 U.S.C. 154(b) by 0 days.

(21) Appl. No.: 09/809,807

(22) Filed: Mar. 16, 2001

(65) Prior Publication Data
US 2002/0036025 A1 Mar. 28, 2002

Related U.S. Application Data

(63) Continuation of application No. PCT/IL99/00508, filed on Sep. 17, 1999.

(30) Foreign Application Priority Data

Sep. 17, 1998 (IL) ................................................ 126274

(51) Int. Cl.[7] .............................................. B65B 31/00
(52) U.S. Cl. ............................ 141/54; 141/37; 141/67
(58) Field of Search ........................ 222/402.1, 402.13, 222/402.16, 402.2, 402.25, 464; 141/37, 44, 54, 67, 97, 192

(56) References Cited

U.S. PATENT DOCUMENTS

| 4,363,424 A | * | 12/1982 | Holben et al. ................... 222/4 |
| 6,036,054 A | * | 3/2000 | Grill .............................. 222/3 |

FOREIGN PATENT DOCUMENTS

| DE | 3120039 | * | 12/1982 |
| DE | 29720670 | * | 1/1998 |
| EP | 0472995 | * | 3/1992 |
| GB | 2074884 | * | 11/1981 |
| GB | 2185092 | * | 7/1987 |
| GB | 2190007 | * | 11/1987 |
| RU | 2021199 | | 10/1994 |
| RU | 2027662 | | 1/1995 |
| RU | 97100347 | | 2/1999 |
| RU | 97110907 | | 6/1999 |

* cited by examiner

Primary Examiner—Timothy L. Maust
(74) Attorney, Agent, or Firm—Merchant & Gould P.C.

(57) ABSTRACT

A liquid aerating apparatus—in combination with a cylinder containing gas under pressure (53); a cylinder holder (30) for retaining a pressure gas cylinder; an aerating (61) head for retaining a bottle (63) which contains a liquid to be aerated; an intermediate chamber (38), for receiving gas discharged from the cylinder (531); a cylinder valve (32) for normally preventing discharge from the cylinder into the chamber and permitting it when desired; valve actuating means (17') which have an inactive position, in which they do not act on the cylinder valve, and an active position, in which they cause the cylinder valve to be opened and gas to be discharged from the cylinder to the intermediate chamber; gas conduit mans (20 connecting the intermediate chamber with the aerating head; and auxiliary valve means (39) for sealing off the intermediate chamber from the conduit means when the cylinder valve is not fully closed and the valve actuating means are in the inactive position. The auxiliary valve means comprises a control chamber (25), a plunger (42) sealing off the control chamber from the intermediate chamber when the valve actuating means are in the inactive position and permitting passage of gas from the intermediate chamber when the valve actuating means are in the active position.

12 Claims, 7 Drawing Sheets

US 6,648,028 B2

1

SAFETY DEVICE FOR LIQUID AERATING APPARATUS

This application is a continuation of international application number PCT/IL99/00508, filed Sep. 17, 1999.

FIELD OF THE INVENTION

This invention relates to apparatus for aerating liquids, and in particular to portable machines for preparing aerated beverages and more particularly, to a safety device for such machines.

BACKGROUND OF THE INVENTION

Apparatus for preparing aerating beverages are very widely used in the home. Because of such widespread home use, safety requirements for such apparatus are particularly stringent.

In the aerating machine to which this invention refers, a bottle containing liquid to be aerated is loaded onto the machine and the gas is introduced into the machine and passed through the liquid contained in the bottle. The bottle is subsequently removed, when the aerating has been completed.

The gas used for aerating is supplied from a gas cylinder or balloon, which can be fitted onto the machine, on a part thereof hereinafter called "cylinder holder", and replaced when it has become exhausted. A valve—hereinafter "the cylinder valve" is provided to control the flow of gas from the cylinder. Usually the cylinder is rechargeable and said valve is fitted onto its outlet, but may be part of the machine in the case of disposable cylinders. The bottle containing the liquid to be aerated, is fitted on another part of the machine, which will be called "the aerating head".

Gas conduit means are provided in the machine for permitting gas to flow from the cylinder holder to the aerating head. When the cylinder valve is opened, gas passes into the cylinder holder and from it to the aerating head and through the liquid, generating an internal pressure within the machine and inside the bottle, which pressure is limited to a given maximum level by a valve, which will be called "the exhaust valve". Said pressure is called hereinafter "the system pressure". When the liquid aeration has been completed, which may be indicated by a sound produced by the exhaust valve when it opens to prevent the pressure from rising further, and the bottle is removed from the machine. In order to remove the bottle, it is tilted, and this causes a lever, hereinafter called "the tilting lever" to be tilted as well. Tilting the tilting lever causes a valve to be opened and to vent the pressure within the machine to the atmosphere.

A typical way of operating the cylinder valve consists in actuating, e.g., by means of a lever—hereinafter "the actuating lever"—a plunger which is in contact or in abutting relationship with a pin of the valve and, when actuated, displaces the valve pin, against the reaction of valve spring, so that it becomes detached from its seat and allows gas to flow between pin and seat. When the actuating lever is released, the reaction of the valve spring returns the valve pin to its closing position in its seat, and the plunger returns to its non-actuated position. The flow of gas from the gas cylinder to the machine and then to the bottle ceases. Another spring—"the actuating lever spring"—returns the actuating lever to its inactive position.

A aerating apparatus of this kind is described in European Patent No. 472.995, the entire contents of which are incorporated herein by reference. This invention is not limited to its application to the apparatus of EP 472.995, since it may be usefully applied to other liquid aerating apparatus. However, it will be described, by way of example and by way of preferred application, with reference to the said European patent.

FIG. 1 represents the portion of the apparatus of the said European patent on which the gas cylinder is mounted, only the top portion of the gas cylinder being shown. Numeral 10 designates a cylinder holder. Numeral 11 designates gas cylinder, on the neck of which the body 12 of a cylinder valve is mounted, e.g. by screwing. The gas cylinder is fitted onto the cylinder holder 10, e.g. by screwing said valve body onto said cylinder holder. The valve body 12 has a valve chamber which houses spring 14. A valve pin 15, having a gasket 16, is urged by spring 14 against a seat formed in said valve body, which is provided with a bore through which a projection of the pin passes. The cylinder holder 10 is provided with an actuating lever 13, hingedly connected thereto at 18, and which can be manually depressed and is urged to its normal, inoperative position by an actuating lever spring 70'. When depressed, it bears upon a plunger 19 slidable in the cylinder holder and depresses it. The lowermost end of plunger 19 contacts said valve pin 15. Therefore, when lever 13 is depressed, said plunger causes said pin to be depressed, compressing spring 14 and leaving a space between the pin and its seat, through which gas can pass from the cylinder to a chamber 17 defined by inner surfaces of the cylinder holder and by the top surface of the cylinder valve, and therefrom to conduit 20, only partially shown, from which the gas passes to the aerating head (not shown in FIG. 1) on which is mounted the bottle containing the liquid to be aerated. When lever 13 is released by the operator—as it may be released several times, and finally, when the escape of gas through the exhaust valve (not shown) indicates that the maximum pressure allowable within the machine has been reached—spring 14 causes valve pin 15 to rise and to close the cylinder valve, thus terminating the flow of gas from the cylinder to the bottle through conduit 20.

However, should foreign material become trapped between valve pin 15 and its seating when the pin is depressed, this foreign material will prevent the pin from seating when lever 13 is released so that gas continues to flow from the gas cylinder to chamber 17 to the liquid containing bottle and/or to be discharged through the exhaust valve. While the machine is designed so that this has no harmful consequences, the user may become aware of the constant flow of gas and take some action, which action may initiate a serious malfunction of the machine and cause inconvenience to the user.

It will be understood that the aforesaid possible drawbacks are not limited to the device of European Patent 472.995, but are common to any liquid aerating apparatus in which the flow gas from a pressure gas cylinder to the apparatus and to the bottle containing the liquid is controlled by a valve that is opened by hand-actuating a mechanical element, such as a lever or the like. In any such apparatus, the possibility of the malfunction hereinbefore described exists and this invention is applicable to it.

Accordingly, it is a purpose of this invention to eliminate the aforesaid drawbacks from liquid aerating apparatus.

More specifically, it is an object of this invention to stop the flow of gas from the gas cylinder or balloon, whenever the user wishes to stop it, regardless of possible malfunctions of the valve which controls the outlet of said cylinder.

It is another purpose of this invention to provide, in a liquid aerating apparatus, in which a hand-operated mechanism is used to open the cylinder valve, to provide additional valve means, viz. means for automatically stopping the flow of gas from the gas cylinder to the aerating head and to the liquid containing bottle, if the cylinder valve has a malfunction.

It is a further purpose of this invention to assure that, should a cylinder valve pin be prevented from closing, due to wear or damage or for any reason, the flow of gas to the carbonating system is still prevented and further operation of the pin depressing means is inhibited or at least made difficult.

Other purposes of this invention will appear as the description proceeds.

SUMMARY OF THE INVENTION

The invention provides safety means for a liquid aerating apparatus, which apparatus comprises a cylinder holder for retaining a pressure gas cylinder, and an aerating head for retaining a bottle which contains a liquid to be aerated.

When the gas cylinder is mounted on the cylinder holder, an intermediate chamber is defined in said cylinder holder or between the same and the gas cylinder, for receiving gas discharged from said cylinder. A cylinder valve is provided for normally preventing discharge from said cylinder into said chamber and permitting it only when desired. Said cylinder valve may be part of the cylinder holder or may be mounted on the cylinder, depending on the type of cylinder used. In the latter case, the valve may be, e.g., screwed onto the neck of said cylinder, so that the used gas cylinder can be removed together with its valve from the cylinder holder, and substituted with a fully charged cylinder. However, the invention is equally applicable to apparatus in which the cylinder valve is fixed to the cylinder holder and the cylinder itself is, for example, disposable. In any case, when the cylinder valve is open, gas is discharged from the cylinder into the intermediate chamber. Conduit means are provided connecting said intermediate chamber to the aerating head and permitting gas to flow therethrough and, from the aerating head, to the bottle mounted thereon. Exhaust valve means are provided for limiting the pressure in the intermediate chamber, in the gas conduit means and in the aerating head to a predetermined maximum value. Since the aerating head and the exhaust valve means are not part of this invention, they will not be described herein in any detail.

Finally, valve actuating, kinematic means are provided which have an inactive and an active position. In the inactive position, they do not act on the cylinder valve, which remains closed. In the active position, they cause the cylinder valve to be opened and gas to be discharged from the cylinder to the intermediate chamber, They preferably comprise a lever and a kinematic connection whereby, when the lever is manually depressed, the cylinder valve poppet is also depressed to open said valve against the elastic reaction of elastic means, such as a helical spring and internal gas pressure. The aforesaid combination of means is part of the prior art, and is described, in a particularly advantageous form thereof, in European Patent 472.995.

According to this invention, safety means, which comprises essentially auxiliary valve means, is provided for sealing the intermediate chamber, into which gas is discharged from the gas cylinder, from the conduit means leading to the aerating head, when: a) the cylinder valve is at least partially open and permits gas to escape or leak from the gas cylinder into the intermediate chamber, and b), concurrently, the valve actuating means are in the inactive position, in which they are incapable of displacing any parts of the cylinder valve. Therefore, the intermediate chamber is only sealed when the cylinder valve is held open or partially open by foreign material, and not when it is held open by plunger 19 through pin 15 (see FIG. 1).

Said auxiliary valve means, interposed between the gas cylinder valve and the bottle containing the liquid to be aerated, comprise an inner chamber, apertures for permitting gas to pass through said chamber so as to flow from said gas cylinder valve to said bottle and means for sealing said apertures to prevent said gas flow unless said sealing means are inactivated by kinematic means. Preferably, the sealing means comprise a plunger having a first and a second surface exposed to the pressure in the inner chamber, said first surface having a larger area than said second surface, whereby to generate a pressure force actuating said plunger to seal the apertures of said inner chamber of the auxiliary valve.

In an embodiment of the invention, said auxiliary valve means comprises a control chamber, having a first aperture in communication with the intermediate chamber and a second aperture in communication with conduit means for leading the gas from said control chamber to the aerating head, plunger means for normally concurrently sealing said apertures when the cylinder valve is closed and the valve actuating means are in the inactive position and concurrently freeing them when the valve actuating means are in the active position, said plunger means having such surface areas exposed to the gas pressure in the intermediate chamber that said pressure generates a force displacing said plunger means concurrently to seal said apertures of said control chamber when the cylinder valve is not fully closed and the valve actuating means are in the inactive position In a particularly preferred embodiment of the invention, the cylinder valve comprises a valve housing defining a valve chamber having an inlet communicating with the gas cylinder outlet and an outlet to an intermediate chamber; a poppet which has a pin slidable in said valve chamber outlet, a piston housed in said valve chamber and solid with it or attached to said pin, a seat projection in said valve housing about said outlet to the intermediate chamber, which projection can be engaged by said poppet piston in a gas-tight manner for preventing the discharge of gas from the valve chamber into the intermediate chamber, and elastic means, in general a helical spring, for urging said poppet body so to engage said seat projections In said embodiment, the auxiliary valve means comprise a control housing which is housed in the cylinder holder, constitutes the upper boundary of said intermediate chamber, has top, bottom and peripheral walls and defines a control chamber, said top and bottom walls having each an aperture and said peripheral wall having an outer surface spaced from the inner surfaces of the cylinder holder to define a gas passage communicating with the conduit that leads the gas to the aerating head, a seat projection being defined in the lower surface of said bottom wall about said top wall aperture. A plunger is slidable in the cylinder holder and the control housing from an uppermost to a lowermost position, and comprises, from top to bottom, a stem passing through said aperture of said control housing top wall, a piston housed in said control chamber, a shank having a cross-section substantially smaller than that of said plunger stem and also housed in said control chamber, and a head slidable to seal, with the help of sealing gasket means, or free said aperture of said control chamber bottom wall. When said plunger is in its uppermost position, the plunger piston tightly engages said seat projection of said control housing and said plunger head seals said aperture of said control housing bottom wall so that said control chamber is tightly sealed. When said plunger is brought to its lowermost position by manually depressing an actuating lever, the plunger piston ceases to engage said seat projection of said control housing and said plunger head is displaced to below said aperture of said control chamber bottom wall and engages said poppet pin so as to disengage said poppet piston from said seat projection of said valve housing against the reaction of the aforesaid elastic means, whereby gas can freely flow from the gas cylinder to the valve chamber, from this latter to the intermediate chamber, from this latter to the control chamber, and from this latter to a gas passage communicating with the conduit that leads the gas to the aerating head.

In this type of apparatus, when the lever is released by the operator and is urged back by the gas pressure in the control chamber, the spring of the cylinder valve urges the poppet piston back into engagement with its seat projection, and the poppet pin, engaging the control plunger head, returns the plunger to its original position. The actuating lever is returned to its final, inactive position, by spring means, leaving a gap between it and the plunger 19. However, if the cylinder valve malfunctions for any reason, and the poppet piston is not returned to its engagement with its seat projection, or is not fully returned to it, the cylinder valve does not fully close and gas continues to be discharged into the intermediate chamber. Pressure is created in said chamber and in the control chamber and generates an upwardly thrust on the lower face of the plunger piston and a downwardly thrust on its upper face. However, the area of the lower face that is exposed to the pressure is larger than the corresponding area of the upper face, because the plunger shank has a smaller cross-section than the plunger stem. Therefore the pressure displaces the plunger to its uppermost position, wherein it seals off the control chamber and the gas cannot pass from it to the conduit to the aerating head.

In an apparatus comprising the invention, if the cylinder valve malfunctions and the gasket means, which help to seal the aforesaid aperture of said control chamber bottom wall, is damaged, and gas leakage occurs, the auxiliary valve seals the intermediate chamber off from the conduit means to the aerating head, and the pressure is not discharged from the intermediate chamber when the bottle is removed from the machine, although it is discharged from the aerating head and the aforesaid conduit means. When a fresh bottle is fitted onto the aerating head, the operator will be able to repeat the aerating operation, but will have to overcome the force exerted on the valve poppet by the pressure in the intermediate chamber and therefore will have to make a stronger effort to operate the valve actuating lever.

The safety means, and particularly the auxiliary valve hereinbefore defined, while described in connection with an apparatus as described in European Patent 472.995, are applicable in general to any liquid aerating apparatus comprising a gas pressure cylinder and a bottle containing the liquid to be aerated. The invention, therefore, generally provides safety means comprising an auxiliary valve, which comprises an inner chamber, apertures for permitting gas to pass through said chamber so as to flow from said gas cylinder valve to said bottle and means for sealing said apertures to prevent said gas flow unless said sealing means are inactivated by kinematic means. In a preferred embodiment, the sealing means comprise a plunger having a first and a second surface exposed to the pressure in the inner chamber, said first surface having a larger area than said second surface, whereby to generate a pressure force actuating said plunger to seal the apertures of said inner chamber of the auxiliary valve. The difference between the areas of the first and of the second surface exposed to the pressure in the inner chamber, is sufficient to generate the pressure force actuating the plunger to seal the apertures of said inner chamber of the auxiliary valve whenever the gas cylinder valve is not fully closed. The auxiliary valve is preferably located above the gas cylinder valve and the first and second plunger surfaces are the lower and the upper surface respectively. In a preferred embodiment, said auxiliary valve comprises an inner chamber, apertures for permitting gas to pass through said chamber so as to flow from said gas cylinder valve to said bottle and means for sealing said apertures to prevent said gas flow unless said sealing means are prevented from sealing said apertures by kinematic means.

DETAILED DESCRIPTION OF PREFERRED EMBODIMENTS

Figure 1:
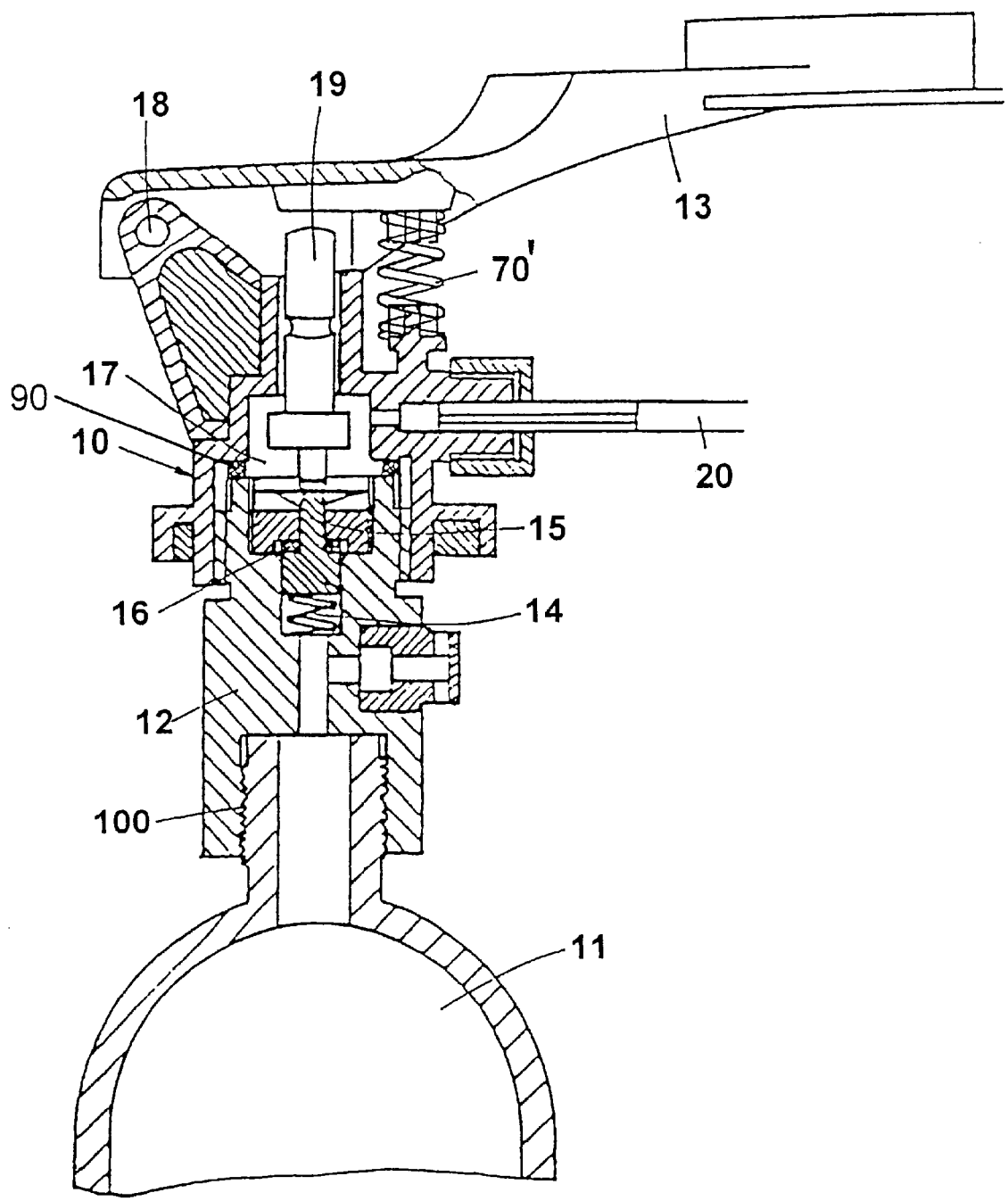
FIG. 1 represents a cylinder holder according to the prior art and, more specifically, according to the cited EPA 472.995, the gas cylinder being only fragmentarily shown.

The prior art cylinder holder of FIG. 1 has been described hereinbefore. It should be emphasized, once again, that this is only a device to which the invention is preferably applied, but that any liquid aerating device, in which gas discharged from a gas cylinder flows into an intermediate chamber and thence through conduit means to the liquid-containing bottle, and which is provided with means for opening the gas cylinder valve to admit gas to the intermediate chamber, can be advantageously supplied with the safety means according to the invention.

Figure 2:
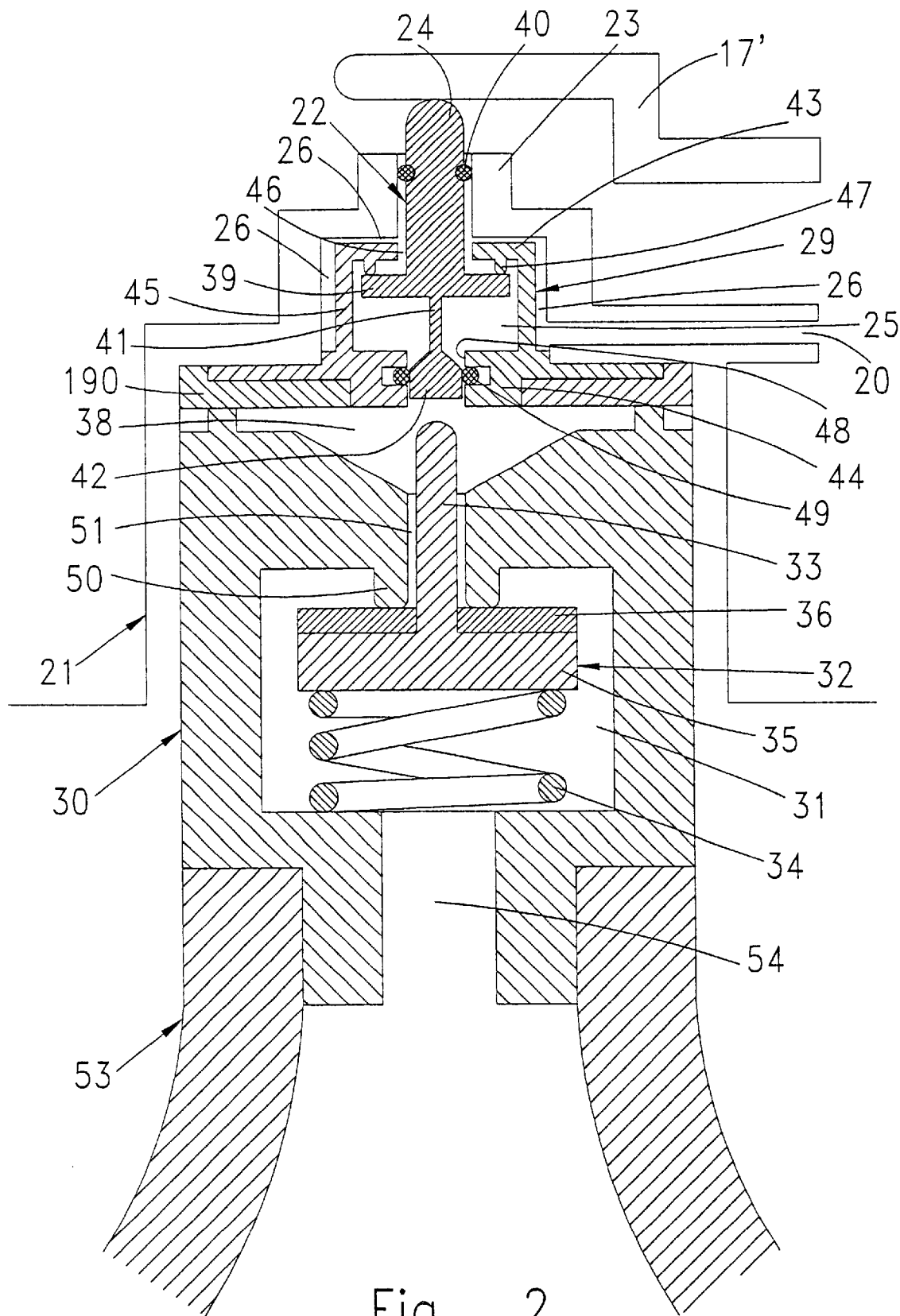
FIGS. 2 and 3 are cross-sections of the valve and auxiliary valve according to an embodiment of the invention, showing them in two different operative conditions, the cylinder holder and the gas cylinder being only fragmentary and schematically shown.

FIG. 2 illustrates a safety device, specifically an auxiliary valve, according to the invention, and the parts of the liquid aerating machine directly cooperating with it, in the inactive condition, viz. when the machine is not being used and liquid is not being aerated. Numeral 21 generally designates a cylinder holder which is only partially and schematically shown. Numeral 20 schematically designates the initial portion of the gas conduit connecting the cylinder holder to the aerating head. This latter, as well as the remaining part of the conduit, is not illustrated, since it may be of any desired kind, particularly such as is described in EP 472.995, with the only condition that it comprise an exhaust valve for discharging pressure from the aerating head and the remaining part of the apparatus when a) a predetermined maximum pressure has been reached in the aerating operation, and/or b) the bottle is removed from the machine.

As seen in FIG. 2, a guide cylinder 23 is defined at the top of the cylinder holder 21. A plunger generally indicated at 22 comprises a stem 24, a piston 39 and a head 42. Plunger stem 24 is slidable in said guide cylinder 23, generally in a substantially vertical direction. A gasket 40, which is an "O" ring, seals the clearance between said plunger stem and said guide cylinder. Plunger stem 24 is solid with or connected to the plunger piston 39, which is solid with or connected to a shank 41, and this latter is connected to the plunger head 42. A control housing 29 has a top wall 43, a bottom wall 44 and a peripheral wall 44. Top wall 43 has an aperture 46 through which plunger stem 24 passes, and is provided in its lower surface, about said aperture, with downwardly projection 47 against which plunger piston 39 bears, sealing aperture 46, when the plunger is in its uppermost position. Control housing 29 defines an internal control chamber 25. A peripheral gap 26 between the outer surfaces of the control housing 29 and the inner surfaces of the cylinder holder 21 places chamber 25 in communication with conduit 20, only partially shown, from which the gas passes to the bottle containing the liquid to be aerated. Shank 41 ends with a head 42, which is slidable in a generally cylindrical opening 48 of the bottom wall 45 of the chamber housing. An annular recess in said opening 48 houses a gasket 49, which is an "O" ring and seals said opening 48 when said plunger head 42 is located within it, viz. in the uppermost position of the plunger.

The head of the cylinder valve is generally indicated at 30. It defines a valve chamber 31. In said chamber is housed a valve poppet 32, which comprises a poppet pin 33 and a poppet piston 35, provided with an upper layer 36 of gasket material, which is urged by a spring 34 against projection 50 disposed about an outlet 51 of said chamber 31 and constituting a seat for the valve poppet. When the cylinder valve is closed, said gasket layer 36 is pressed by spring 34 against said projection 50 and seals said outlet 51, thereby sealing the valve chamber 31 from an intermediate chamber 38 defined between the top of cylinder valve 30 and the bottom of control housing 29. Thus also the gas cylinder, fragmentarily indicated at 53, which communicates with said valve chamber 31 through an inlet 54, is sealed from said intermediate chamber 38.

Figure 3:
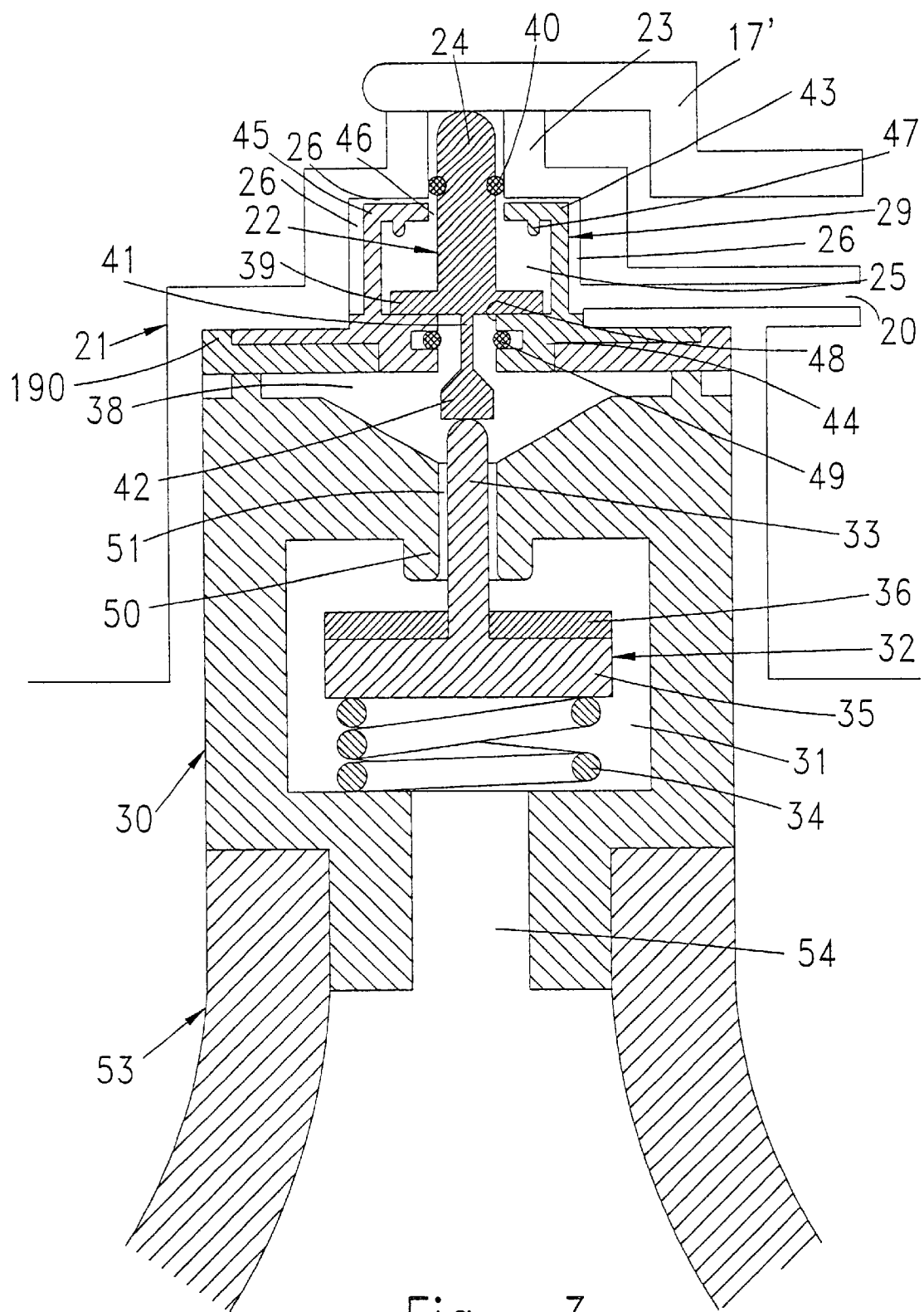

In FIGS. 2 and 3 only a fragment of the cylinder valve actuating means is shown. Said valve actuating means are assumed to be, in this embodiment, essentially the same as in the prior art machine of FIG. 1, viz. to comprise a lever hinged to the cylinder holder and having a portion adapted to engage and depress the valve control plunger 22. The portion of said control means shown in FIGS. 2 and 3 is a fragment of actuating lever 13 (see FIG. 1), which portion is indicated by numeral 17'. When lever 13 is actuated, portion 17' thereof engages plunger stem 24 and depresses the plunger 22. Plunger head 42 is displaced to below opening 48 of the control chamber, and contacts and depresses poppet pin 33 and poppet 32 against the reaction of spring 34 and internal gas pressure. Poppet piston 35–36 becomes detached from projection 50 and therefore allows gas to escape from the gas cylinder and valve chamber 31 into intermediate chamber 38. This condition is shown in FIG. 3. It is seen that piston 39 no longer engages projection 47 and has freed the aperture 46 of wall 43. Thus the auxiliary valve has opened, and gas can flow from intermediate chamber 38 into control chamber 25, therefrom, through peripheral gap 26, into conduit 20, and finally to the bottle containing the water to be carbonated.

When the operator releases the lever that is part of the kinematic system which actuates the cylinder valve, this latter will normally close the cylinder outlet and gas will no longer escape from the cylinder. The gas pressure urges the valve poppet to its closing position. Then the gas pressure retained in the intermediate chamber 38 and in the control chamber 25 by the plunger stem 24 and the gasket seal 49 pushes the plunger to its uppermost, sealing position.

However, if the cylinder valve malfunctions, poppet 32 will not have risen to its original position, and therefore gas continues to escape into chamber 38. Therefore gas pressure exists in intermediate chamber 38, in control chamber 25, in annular space 26 and in conduit 20 and other parts of the machine. Since the cross-sectional area of the bottom of piston 39, on which said pressure generates an upwardly thrust, is larger than the free area of its top, on which said pressure generates an opposite thrust, a differential thrust is exerted by the gas in an upwardly direction and urges the entire plunger 22 to its uppermost position, shown in FIG. 2, in which apertures 46 and 48 are closed by plunger piston 39 and plunger head 42 respectively, control chamber 25 is sealed off, and gas can no longer escape from the gas cylinder to the bottle through peripheral gap 26 and conduit 20. The same pressure as in the gas cylinder, e.g. about 50 bar, is created in the intermediate chamber 38. The control chamber 25 is at the same pressure as annular space 26, conduit 20 and other parts of the machine.

If the valve poppet 32 is held open, the cylinder pressure (which may be, e.g. 50 bar) acts over the lower surface of plunger head 42 in an upward direction, while the system pressure (which may be e.g. 8 bar) acts over the upper surface of piston 39 but is balanced by the same pressure acting over its lower surface, until the system pressure has been released. Thereafter the operator, in order to open the cylinder valve, would have to overcome a force equal to the product of the system pressure by the upper area of piston 39 plus the product of the cylinder pressure by the area of head 42.

When the machine is in the condition of FIG. 3, the aerating operation can be repeated, but the operator will find it difficult since he has to overcome the thrust due to the high pressure in intermediate chamber 38. If the operator wishes to remove the gas cylinder, the cylinder valve head will become detached from the washer seal 190 (corresponding to 90 in FIG. 1) and gas can flow from chamber 38 (see FIG. 3) through the annular space between threads of cylinder holder 21 and valve body 30. Pressure therefore will be reduced to atmospheric pressure, the gas cylinder can be safely removed and substituted with a fresh one, and thereafter the machine will operate in a normal way.

Figure 4:
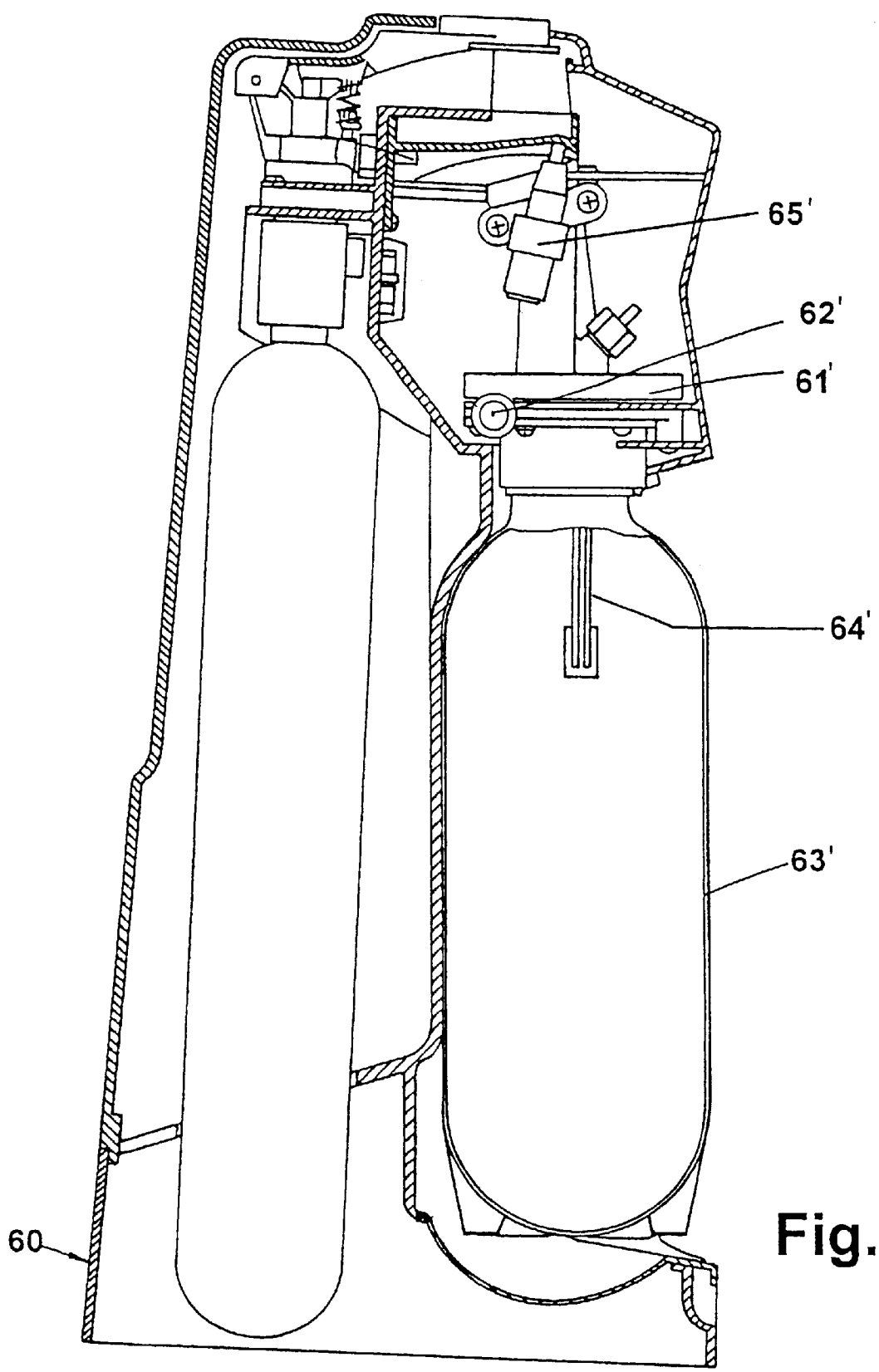
FIG. 4 is a vertical view of a liquid aerating apparatus according to an embodiment of the invention.

FIG. 4 schematically illustrates a liquid aerating apparatus comprising the safety means of the invention. Numeral 60 indicates the apparatus main body, on which is hinged at 62' an aerating head 61'. Bottle 63' is mounted, e.g. threaded, on said head 61'. Tube 64' is connected to the previously described gas conduit 20 by which the gas is led into the bottle. An exhaust valve, of any suitable kind and e.g. as described in European patent 472.995, is provided at 65', for discharging pressure from the bottle, the gas conduit means and the intermediate chamber. Means are provided for actuating the exhaust valve to release pressure when the bottle is swung about hinge 62' beyond a certain angle, as occurs in any case when the bottle is removed from the aerating head. Said means, as well as other safety valve means that can be provided, are not described, as they may be of any kind known in the art, and e.g. as described in European patent 472.995. The cylinder holder and cooperating parts are as illustrated in FIGS. 2 and 3 and described hereinbefore.

In order further to illustrate the invention, a summary is given hereinafter of the sequences of operations carried out when operating a machine according to the aforesaid European Patent 473.995 and when operating a machine according to this invention. The machine according to the aforesaid European Patent 473.995 comprises three valves: EXHAUST, VENT and SAFETY valve. The following operational stages occur when the liquid contained in a bottle, which has been fitted into the machine, is carbonated, viz. be mixed with a gas that is in general carbon dioxide.

When the actuating lever is depressed by the user, the following operational stages occur:

a. The cylinder valve is opened to admit gas into the bottle.
b. System reaches pressure—EXHAUST valve buzzes.
c. Tilt the bottle thereby operating a tilt lever.
d. VENT valve releases pressure after a few degrees movement of the tilt lever and stays open until the tilt lever returns to the carbonating position.
e. One valve is now open.
f. Move tilt lever more.
g. Vent pin opens EXHAUST valve by pushing the EXHAUST valve poppet off its seating and any remaining pressure is released,
h. Two valves now open.
i. Move tilt lever more.
j. Safety pin opens SAFETY valve by pushing the valve poppet off its seating, and any remaining pressure is released.
k. All three valves are open.

When the actuating lever is released by the user, the following operational stages occur:

a. The gas pressure, combined with the pressure exerted by the cylinder valve spring (14 in FIG. 1), urges the valve poppet pin (15 in FIG. 1) to close.
b. This movement pushes the plunger (19 in FIG. 1) upwards, which pushes the actuating lever (13 in FIG. 1) upwards.
c. The valve poppet pin closes; no farther upward movement is possible for this part.
d. The plunger is urged upwards due to gas pressure acting over the area which is sealed from the atmosphere, which pushes actuating lever upwards.
e. The plunger comes up against a mechanical stop; 110 further upward movement is possible for this part.
f. The actuating lever continues to move upwards to its inactive position under the action of the lever spring (70', in FIG. 1).

The machine according to the embodiment of the invention illustrated herein operates through the following operational stages, described with reference to FIG. 3, unless otherwise specified Normal Operation a. Press lever down, gas is released from cylinder (wherein the pressure is e.g. 50 bar) into intermediate chamber 38 to control chamber 25, to aperture 46, to conduit 20, and from it to the aerating head (at a lower pressure of e.g. 8 bar).
b. Release actuating lever 13.
c. The cylinder valve closes and chambers 38 and 25, aperture 46 and conduit 20 are isolated from cylinder pressure and all the system goes to a lower pressure, e.g. 8 bar, which is the system pressure.
d. Release actuating lever 18
e. Plunger head 42 seals the outlet 48 of the intermediate chamber 38 and isolates it from chamber 25, aperture 46, and conduit 20. Chamber 38 maintains the system pressure.
f. Release actuating lever 13.
g. Piston 39 makes sealing contact with projection 47 and the upward movement of plunger 22 is halted; said piston also isolates (though not quite perfectly) control chamber 25 from peripheral gap 26 and conduit 20. Chamber 25 maintains the system pressure (e.g. 8 bar).
h. Release actuating lever 13; spring 70' (see FIG. 1; not visible in FIG. 3) returns lever 13 to its inactive position.
i. Plunger 22 is now subjected to an upward force, due to said system pressure (e.g. 8 bar) acting over the area defined by "O" ring 40.
j. Release pressure in system by tilting the bottle, thereby operating the tilting lever.

The release of the actuating lever is mentioned in four of the above steps. In actual use, however, said release is a continuous movement.

k. The pressure in gap 26 and conduit 20 goes to atmospheric pressure.
l. Control chamber 25 maintains the system pressure (e.g. 8 bar) or may decay to atmospheric pressure as its seal is not perfect (see stage g).
m. Intermediate chamber 38 maintains the system pressure (e.g. 8 bar).
n. The upward force on plunger 22 due to pressure is still the previous system pressure (e.g. 8 bar) acting on the area defined by "O" ring 40 in the bore of guide cylinder 23 (see FIG. 2) as plunger head 42 is of smaller diameter than "O" ring 40. This is the case, regardless of whether control chamber 25 maintains the previous system pressure or leaks to the atmosphere.
o. Make a new bottle of soda.
p. Press lever down against the said previous system pressure (e.g. 8 bar) acting over the "O" ring 40 area, this force being less than the force required to overcome the opening of the valve poppet against the gas pressure of 50 bar. Therefore the operation appears normal, and this sequence is repeated Abnormal Operation (Scenario 1)

1. Press actuating lever 13 down, gas is released from cylinder (at pressure of e.g. 50 bar) into intermediate chamber 38 and from it to control chamber 25, to gap 26, and to conduit 20 and from it to the aerating head (at pressure of e.g. say 8 bar).
2. Release actuating lever 13.
3. Valve poppet 32 does not seal and gas continues to be released into chambers 38 and 25, to gap 26 and to conduit 20.
4. Release actuating lever 13.
5. Head 42 seals perfectly and isolates chamber 38 from chamber 25, gap 26 and conduit 20. Chamber 38 maintains the cylinder pressure (e.g. 50 bar).
6. Release actuating lever 13.
7. Piston 39 seals on projection 47 and the upward movement of plunger is halted; the piston further isolates ((though not quite perfectly) chamber 25 from gap 26 and conduit 20. Chamber 25 maintains the system pressure (e.g. 8 bar).
8. Release actuating lever 13; spring 70' returns the lever to inactive position.
9. The upward force on plunger 22, due to pressure, is the cylinder pressure (e.g. 50 bar), acting over the area defined by "O" ring 49 sealing on plunger head 42.
10. Release pressure in system by tilting the bottle, whereby the tilting lever is tilted.

11. The system goes to atmospheric pressure and so do gap 26 and conduit 20.
12. Control chamber 25 maintains the previous system pressure (e.g. 8 bar) or may decay to atmospheric pressure as it is not perfectly sealed.
13. Chamber 38 maintains the cylinder pressure (e.g. 50 bar).
14. The upward force on plunger due to pressure is still that generated by the cylinder pressure (e.g., 50 bar), acting on the area defined by "O" ring 49. This is greater if chamber 25 maintains the previous system pressure and does not leak, or unchanged if it leaks back to atmosphere.
15. Make a new bottle of soda.
16. Press actuating lever 13 down against a pressure of 50 bar acting over the "O" ring 49 area, this force being greater than the force required to overcome the opening of the valve poppet against the gas pressure of 50 bar. The operation may appear abnormal, and the extra force required may be noticed. If not, then the sequence will be repeated until the cylinder of gas is empty, and the customer will not be aware that there was ever a problem. If the customer becomes aware that he has to exert an abnormally high force to press the actuating lever, then the cylinder can be removed and gas from intermediate chamber 88 will vent down the cylinder threads 100 (see FIG. 1) and the cylinder will be removed safely.

Abnormal Operation (Scenario 2)

1. Press lever down; gas is released from the gas cylinder, at cylinder pressure (e.g. 50 bar) into intermediate chamber 38 to control chamber 25, to peripheral gap 26, to conduit 20, and from it to the aerating head, at system pressure (e.g. 8 bar).
2. Release actuating lever 13.
3. Valve poppet 32 does not seal and gas continues to be released into chambers 38 and 25, gap 26 and conduit 20.
4. Release actuating lever 13.
5. Head 42 does not seal as "O" ring is damaged, and therefore does not isolate chamber 38 from chamber 25, gap 26, and conduit 20. Gas continues to flow through the system.
6. Release actuating lever 13.
7. Piston 39 seals on projection 47 and the upward movement of plunger is halted; the seal isolates chambers 38 and 25 from gap 26 and conduit 20. Chambers 38 and 25 maintain the cylinder pressure, and seal well because of the cylinder pressure is high (e.g. 50 bar).
8. Release actuating lever 13; spring 70' returns the lever to inactive position.
9. The upward force on the plunger is now that generated by the cylinder pressure acting over the internal area defined by the projection 47 sealingly engaged by piston 89.
10. Release pressure in system by tilting the tilting lever.
11. The system goes to atmospheric pressure and so do gap 26 and conduit 20.
12. Chambers 38 and 25 maintains the cylinder pressure.
13. The upward force on plunger due to pressure is still that generated by the cylinder pressure acting over the internal area defined by the projection 47 sealingly engaged by piston 39.
14. Make a new bottle of soda.
15. Press the actuating lever 13 down against the cylinder pressure (e.g. 50 bar), if possible. The force required to do this is abnormally high, therefore the operation will appear abnormal (in the event that the user continues to operate the machine, the above stages will be repeated until the cylinder of gas is empty.)

It will be understood that the plunger head 42, which isolates the intermediate chamber from the control chamber, can be considered the primary safety device, because in principle it can provide the required safety. The piston 39 is a secondary safety device which operates if the primary device fails. It could work alone, but, if so, the user would normally have to press the actuating lever harder, which is not desirable. The primary safety device is designed to become effective before the secondary safety device, in order to ensure that under both normal and abnormal use (Scenario 1) the customer does not perceive a problem.

Figure 5:
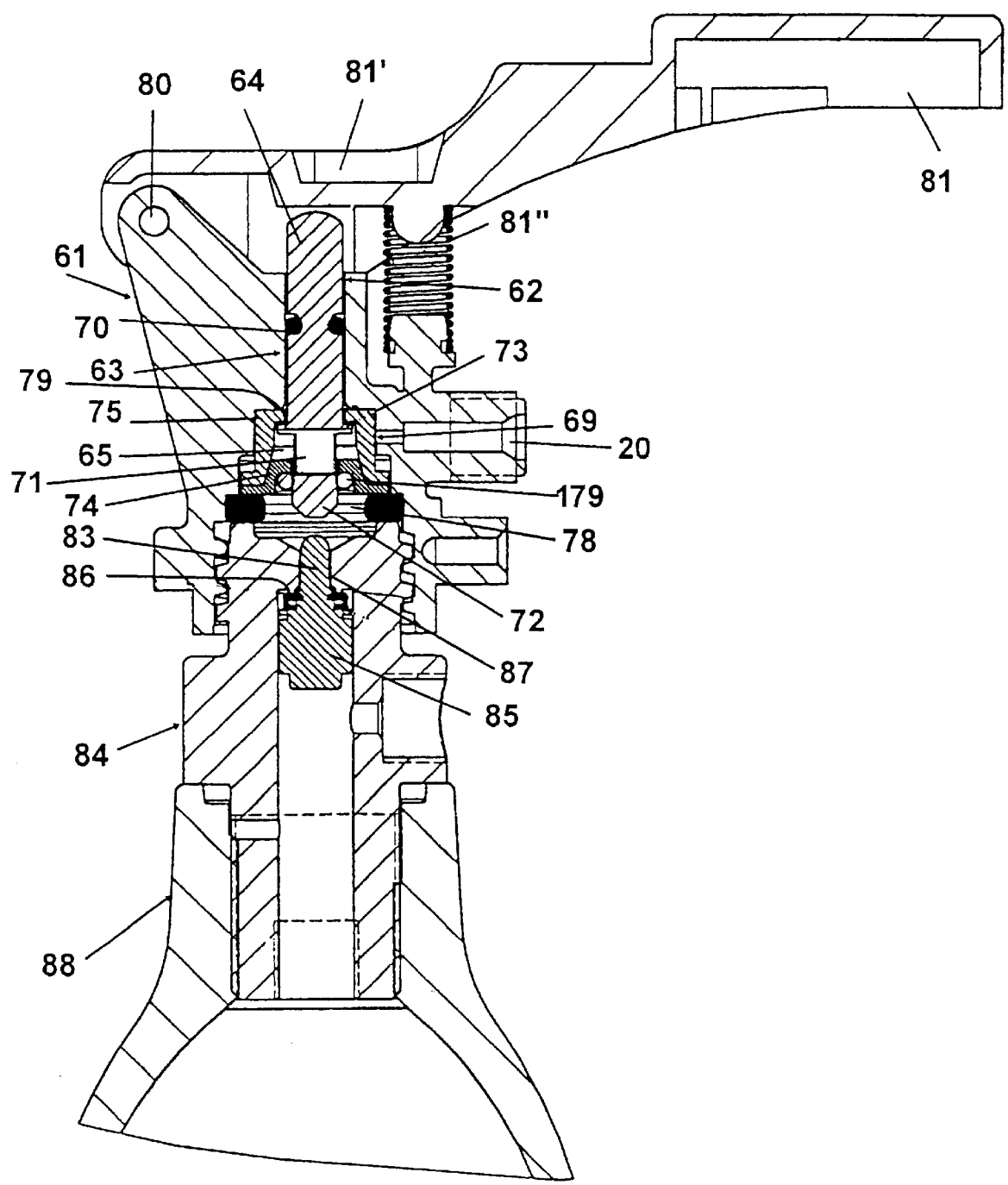
FIGS. 5 and 6 are cross-sections of the valve and auxiliary valve according to an alternative embodiment of the invention, showing them in two different operative conditions analogously to FIGS. 2 and 3.
Figure 6:
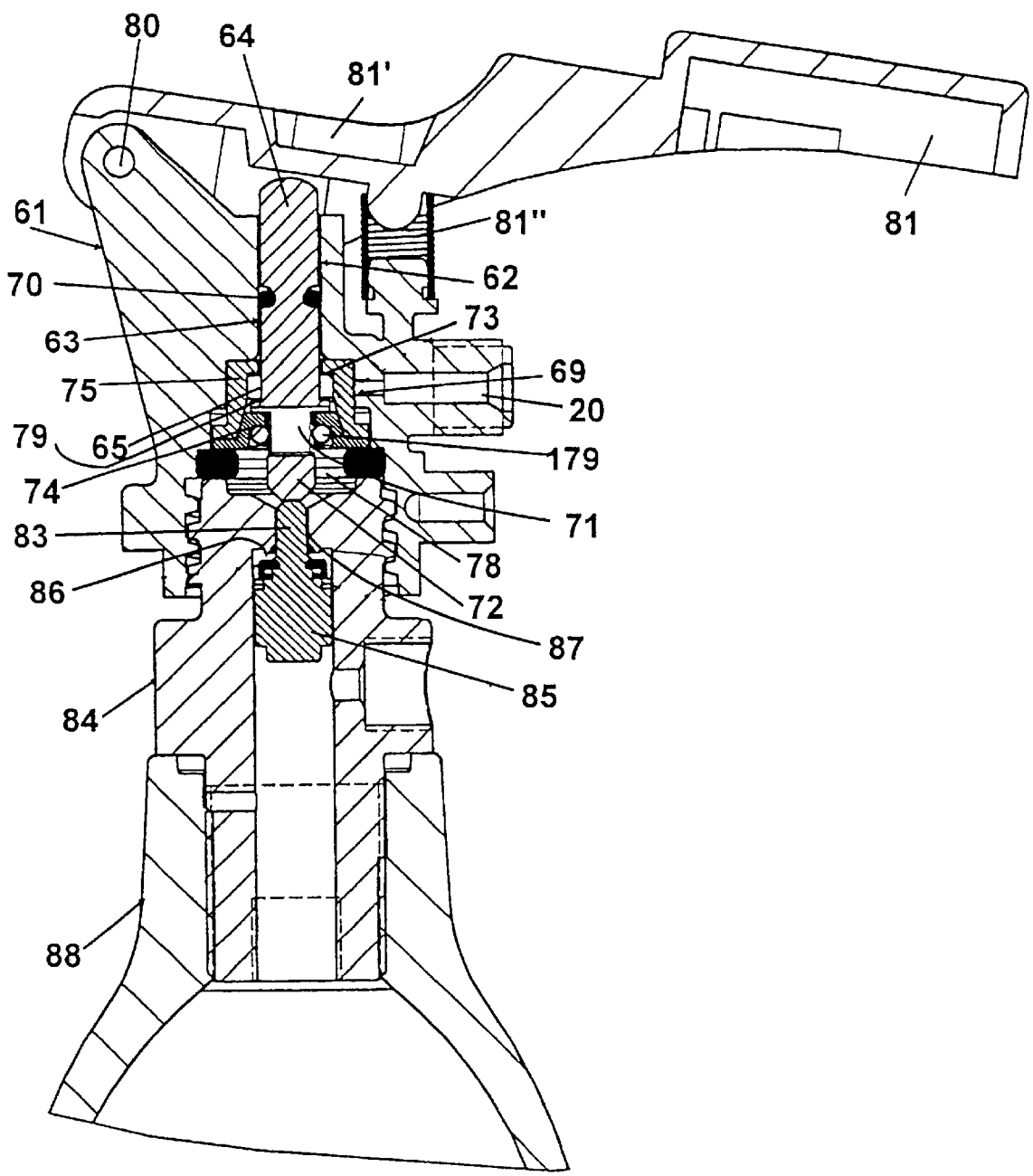

FIGS. 5 and 6 illustrate a second embodiment of the invention, which operates essentially in the same way as that of FIGS. 2 and 3, but is structurally modified with respect to this latter In FIG. 5, a guide attachment 61 is shown, mounted defined at the top of the cylinder holder, which is not shown. Attachment 61 has an inner cylindrical seat 63 and, in this embodiment, is provided with a pin connection 80 to operating lever 81 held in inoperative position by a spring 81". A plunger, generally indicated at 62, comprises a stem 64, a piston 79 and a head 72. Plunger stem 64 is slidable in said cylindrical seat 63, generally in a substantially vertical direction. A gasket 70, which is an "O" ring, seals the clearance between said plunger stem and said guide cylinder. Plunger stem 64 is solid with or connected to the plunger piston 79, which is solid with or connected to a shank 71, and this latter is connected to the plunger head 72. In this embodiment, shank 71 and head 72 constitute a single piece. A control housing 89 has a top wall 73 and a peripheral wall 75. and is completed by a bottom plate 74. An O-ring 179 provides a tight seal between the plunger and the bottom plate 74.

Figure 7:
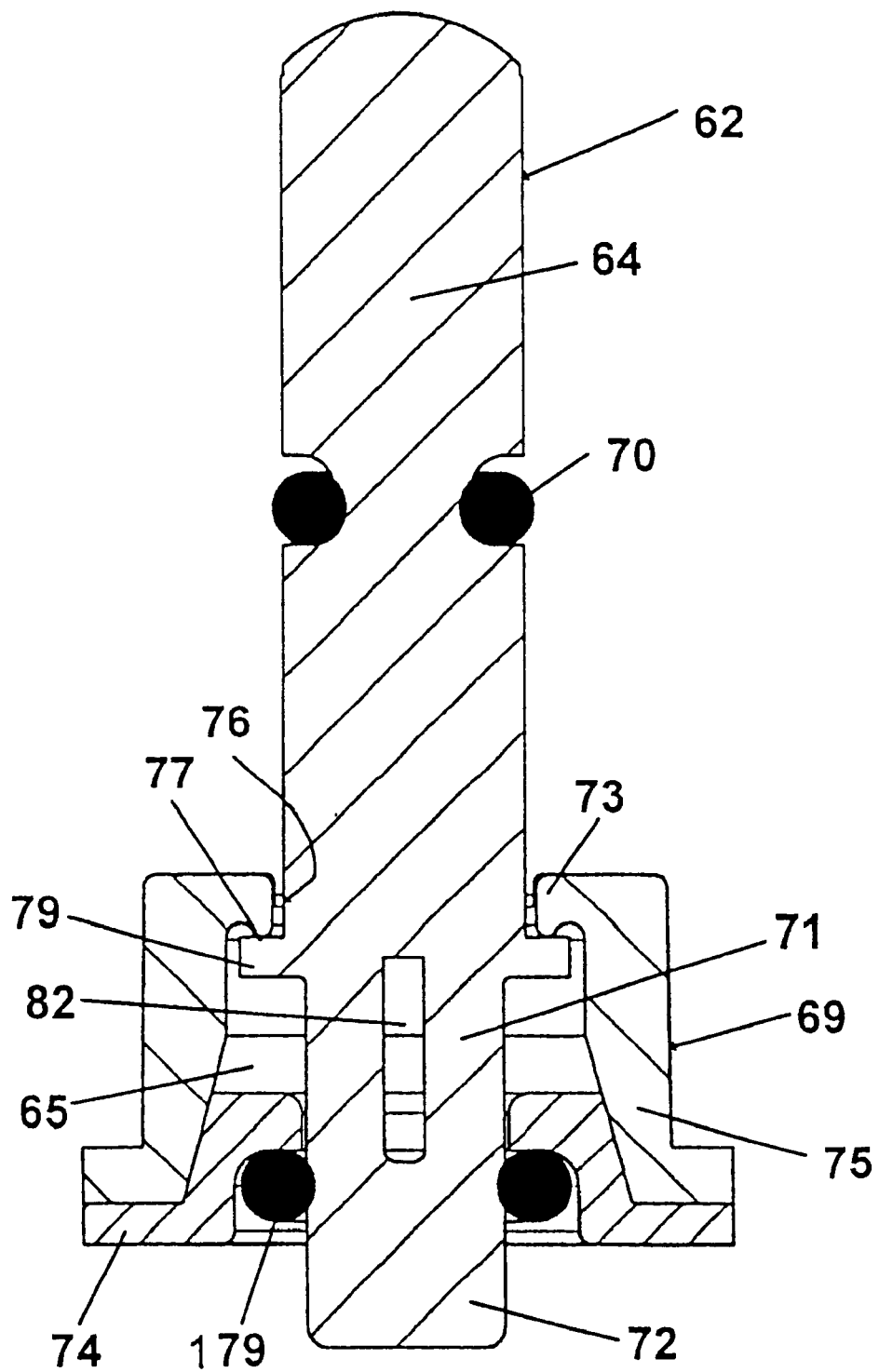
FIG. 7 illustrates in vertical view a plunger which is a component of the embodiment of FIGS. 5 and 6

Plunger and control housing are illustrated at a great scale in FIG. 7. It is seen that the plunger shank 71 has a central slit 82.

Top wall 73 has an aperture 76 through which plunger stem 64 passes, and is provided in its lower surface, about said aperture, with downwardly projection 77 against which plunger piston 79 bears, sealing aperture 76 when the plunger is in its uppermost position. Control housing 69 defines an internal control chamber 65.

The cylinder valve, generally indicated at 84, comprise a poppet 85 provided with a gasket layer on its upper surface. The poppet is urged by the cylinder gas pressure against projection 86 disposed about the lowermost periphery of an outlet 87 of said valve and constituting a seat for the valve poppet. Similarly to what occurs in the embodiment of FIGS. 2 and 3, means, e.g. elastic means, are preferably provided normally to urge poppet 85 against seat 86, regardless of the presence or not of pressure in the cylinder. When the cylinder valve is closed, said gasket layer is pressed against said projection 86 and seals said outlet 87, thereby sealing the gas cylinder, fragmentarily indicated at 88, Lever 81, hinged to the attachment 61, has a portion adapted to engage and depress the plunger 62. When lever 81 is actuated, portion 81' thereof engages the plunger stem and depresses it. Plunger head 72 is displaced to below O-ring 179 and contacts and depresses poppet pin 83 (corresponding to 33 in FIG. 3) and valve poppet 85 against the internal gas pressure. The gasket layer of the poppet becomes detached from projection 86 and therefore allows gas to escape from the gas cylinder and the valve, between the poppet and its seat, into an intermediate chamber 78 formed between the top of cylinder valve 84, viz. said poppet and its seat, and bottom plate 74. This condition is shown in FIG. 6. Thus gas can flow from said intermediate chamber through the slit 82 of the plunger, and therefrom into control chamber 65 and through opening 20, which leads to the conduit connected to the bottle to be carbonated.

When the operator releases the actuating lever, the gas pressure urges the valve poppet to its closing position and gas will no longer escape from the cylinder. Then the gas pressure retained in the intermediate chamber 78 pushes the plunger to its uppermost, sealing position.

However, if the cylinder valve malfunctions, valve poppet 85 will not have risen to its original position, and therefore gas continues to escape into chamber 78 and from it to the internal control chamber 65. Since the cross-sectional area of the bottom of piston 79, on which said pressure generates an upwardly thrust, is larger than the free area of its top, on which said pressure generates an opposite thrust, a differential thrust is exerted by the gas in an upwardly direction and urges the entire plunger 62 to its uppermost position, shown in FIG. 5, in which internal, control chamber 65 is sealed off and gas can no longer escape from the gas cylinder to the bottle through slit 82 and port 20. The same pressure as in the gas cylinder, e.g. about 50 bar, is created in the intermediate chamber 78. The control chamber 65 is at the same pressure as the other parts of the machine.

If the valve poppet 85 is held open, the cylinder pressure (which may be, e.g. 50 bar) acts over the lower surface of plunger head 72 in an upward direction, while the system pressure (which may be e.g. 8 bar) acts over the upper surface of piston 79 but is balanced by the same pressure acting over its lower surface, until the system pressure has been released. Thereafter the operator, in order to open the cylinder valve, would have to overcome a force equal to the product of the system pressure by the upper area of piston 79 plus the product of the cylinder pressure by the area of head 72.

As stated hereinbefore, the embodiment of FIGS. 5 and 6 is functionally equivalent to that of FIGS. 2 and 3 and constitutes an alternative constructional embodiment of the same invention. All the stages of normal and abnormal operation described hereinbefore apply equally to the embodiment of FIGS. 5 and 6.

What is claimed is:

1. A liquid aerating apparatus, comprising, in combination with a cylinder containing gas under pressure and a cylinder holder for retaining a pressure gas cylinder:

an aerating head for retaining a bottle which contains a liquid to be aerated, an intermediate chamber for receiving gas discharged from said cylinder, a cylinder valve for normally preventing discharge from said cylinder into said chamber and permitting it when desired, valve actuating means which have an inactive position, in which they do not act on the cylinder valve, and an active position, in which they cause the cylinder valve to be opened and gas to be discharged from the cylinder to the intermediate chamber, gas conduit means connecting said intermediate chamber with said aerating head, and auxiliary valve means for sealing off said intermediate chamber from said conduit means when said cylinder valve is not fully closed and said valve actuating means are in their inactive position.

2. Liquid aerating apparatus according to claim 1, wherein the auxiliary valve means comprises a control chamber, a plunger head and gasket sealing off said control chamber from the intermediate chamber when the valve actuating means are in the inactive position and permitting passage of gas from said intermediate chamber when the valve actuating means are in the active position.

3. Liquid aerating apparatus according to claim 1, wherein the auxiliary valve means comprise a plunger slidable in a seat from an uppermost to a lowermost position and a control chamber in communication with a gas conduit for feeding gas to a bottle which contains a liquid to be aerated, said plunger having a lowermost part which seals the bottom of said control chamber when said plunger is in its uppermost position and having an opening therein permitting the passage of gas from the cylinder to said gas conduit when said plunger is in its uppermost position, said plunger further comprising a piston having a lower and an upper surface exposed to gas pressure, said lower surface having an area larger than said upper surface.

4. A liquid aerating apparatus, comprising, in combination with a cylinder containing gas under pressure and a cylinder holder for retaining a pressure gas cylinder:

an aerating head for retaining a bottle which contains a liquid to be aerated, an intermediate chamber for receiving gas discharged from said cylinder, a cylinder valve for normally preventing discharge from said cylinder into said chamber and permitting it when desired, valve actuating means which have an inactive position, in which they do not act on the cylinder valve, and an active position, in which they cause the cylinder valve to be opened and gas to be discharged from the cylinder to the intermediate chamber, gas conduit means connecting said intermediate chamber with said aerating head, and auxiliary valve means for sealing off said intermediate chamber from said conduit means when said cylinder valve is not fully closed and said valve actuating means are in their inactive position;

wherein the auxiliary valve means comprises a control chamber having a first aperture in communication with the intermediate chamber and a second aperture in communication with the gas conduit means, plunger means for normally concurrently sealing said apertures when the cylinder valve is closed and the valve actuating means are in the inactive position and concurrently freeing them when the valve actuating means are in the active position, said plunger means having such surface areas exposed to the gas pressure in the intermediate chamber that said pressure generates a force displacing said plunger means concurrently to seal said apertures of said control chamber when the cylinder valve is not fully closed and the valve actuating means are in the inactive position.

5. Liquid aerating apparatus according to claim 4, wherein the auxiliary valve means comprise a control housing which is housed in the cylinder holder, constitutes the upper boundary of said intermediate chamber, has top, bottom and peripheral walk and defines a control chamber, said top and bottom walls having each an aperture and said peripheral wall having an outer surface spaced from the inner surfaces of the cylinder holder to define a gas passage communicating with the conduit that leads the gas to the aerating head, a seat projection being defined in the lower surface of said top wall about said top wall aperture.

6. Liquid aerating apparatus according to claim 4, wherein the auxiliary valve means comprise a plunger slidable in the cylinder holder and the control housing from an uppermost to a lowermost position, and comprises, from top to bottom, a stem passing through said aperture of said control housing top wall, a piston housed in said control chamber, a shank having a cross-section substantially smaller than that of said plunger stem and also housed in said control chamber, and a head slidable to seal or free an aperture of said control chamber bottom wall.

7. Liquid aerating apparatus according to claim 6, wherein, when the plunger is in its uppermost position, the plunger piston tightly engages the seat projection of a control housing and the plunger head seals the aperture of said control housing bottom wall so that said control chamber is tightly sealed.

8. Liquid aerating apparatus according to claim 4, wherein the auxiliary valve means comprise a plunger slidable in the cylinder holder and a control housing from an uppermost to a lowermost position, and comprises, from top to bottom, a stem passing through said aperture of said control housing top wall, a piston housed in said control chamber, a shank having a cross-section substantially smaller than that of said plunger stem and also housed in said control chamber, and a head slidable to seal or free said aperture of said control chamber bottom wall, and wherein when the plunger is brought to its lowermost position by manually depressing the valve actuating means, the plunger piston ceases to engage the seat projection of the control housing and the plunger head is displaced to below the aperture of the bottom wall of said control housing and engages the poppet pin of the cylinder valve so as to disengage the poppet piston from the seat projection of the valve housing against the reaction of the elastic means, whereby gas can freely flow from the gas cylinder to the valve chamber, from this latter to the intermediate chamber, from this latter to the control chamber, and from this latter to a gas passage communicating with the conduit that leads the gas to the aerating head.

9. Liquid aerating apparatus according to claim 6, wherein the aperture of the control housing bottom wall is provided with a gasket, and when the plunger is in its uppermost position, the plunger head tightly engages said gasket to seal said apertures.

10. Liquid aerating apparatus according to claim 6, wherein the cylinder holder has defined therein a guide cylinder and the plunger stem is slidably housed therein, sealing means being provided between said cylinder and said stem.

11. A liquid aerating apparatus, comprising, in combination with a cylinder containing gas under pressure and a cylinder holder for retaining a pressure gas cylinder:
   an aerating head for retaining a bottle which contains a liquid to be aerated,
   an intermediate chamber for receiving gas discharged from said cylinder,
   a cylinder valve for normally preventing discharge from said cylinder into said chamber and permitting it when desired
   wherein the cylinder valve comprises a valve housing defining a valve chamber having an inlet communicating with the gas cylinder and an outlet to an intermediate chamber; a poppet which has a pin slidable in said valve chamber outlet, a piston housed in said valve chamber and solid with it or attached to said pin, a seat projection in said valve housing about said outlet to the intermediate chamber, which projection can be engaged by said poppet piston in a gas-tight manner for preventing the discharge of gas from the valve chamber into the intermediate chamber, and elastic means for urging said poppet body so to engage said seat projections;
   valve actuating means which have an inactive position, in which they do not act on the cylinder valve, and an active position, in which they cause the cylinder valve to be opened and gas to be discharged from the cylinder to the intermediate chamber,
   gas conduit means connecting said intermediate chamber with said aerating head, and
   auxiliary valve means for sealing off said intermediate chamber from said conduit means when said cylinder valve is not fully closed and said valve actuating means are in their inactive position.

12. Liquid aerating apparatus according to claim 10, wherein the poppet piston comprises an elastomeric portion adapted to engage the seat projection of said valve housing about the outlet to the intermediate chamber.

* * * * *

UNITED STATES PATENT AND TRADEMARK OFFICE
CERTIFICATE OF CORRECTION

PATENT NO. : 6,648,028 B2
DATED : November 18, 2003
INVENTOR(S) : Hulley et al.

It is certified that error appears in the above-identified patent and that said Letters Patent is hereby corrected as shown below:

Title page,
Item [56], References Cited, U.S. PATENT DOCUMENTS, please insert the following:
-- 3,858,771    1/1975    Bret et al. --
Item [57], ABSTRACT,
Line 13, reads "ber; gas conduit mans (20 connecting the intermediate" should be changed to read -- ber; gas conduit means (20) connecting the intermediate --

Drawings,
Sheet 1 of 7, Figure 1, please insert -- Fig. 1 -- on the bottom of Figure 1

Column 16,
Lines 15-16, "and permitting it when desired" should read -- and permitting it when desired, --
Line 41, "according to claim 10," should read -- according to claim 11, --

Signed and Sealed this

Eighth Day of June, 2004

JON W. DUDAS
*Acting Director of the United States Patent and Trademark Office*